United States Patent
Zheng et al.

(10) Patent No.: US 9,856,356 B2
(45) Date of Patent: *Jan. 2, 2018

(54) HALOGEN-FREE FLAME-RETARDANT POLYOLEFIN COMPOSITE FOAM MATERIAL AND PREPARATION METHOD THEREOF

(71) Applicant: FUZHOU UNIVERSITY, Fuzhou, Fujian (CN)

(72) Inventors: Yuying Zheng, Fujian (CN); Zhijie Chen, Fujian (CN)

(73) Assignee: FUZHOU UNIVERSITY, Fuzhou, Fujian (CN)

( * ) Notice: Subject to any disclaimer, the term of this patent is extended or adjusted under 35 U.S.C. 154(b) by 42 days.

This patent is subject to a terminal disclaimer.

(21) Appl. No.: 15/100,944

(22) PCT Filed: Dec. 24, 2014

(86) PCT No.: PCT/CN2014/094868
§ 371 (c)(1),
(2) Date: Jun. 1, 2016

(87) PCT Pub. No.: WO2015/131631
PCT Pub. Date: Sep. 11, 2015

(65) Prior Publication Data
US 2016/0304691 A1    Oct. 20, 2016

(30) Foreign Application Priority Data
Mar. 6, 2014 (CN) .......................... 2014 1 0078359

(51) Int. Cl.
*C08J 9/00* (2006.01)
*C08L 23/08* (2006.01)
*C08J 9/08* (2006.01)
*C08J 9/10* (2006.01)

(52) U.S. Cl.
CPC .............. *C08J 9/0061* (2013.01); *C08J 9/00* (2013.01); *C08J 9/0014* (2013.01); *C08J 9/0023* (2013.01); *C08J 9/0028* (2013.01); *C08J 9/0052* (2013.01); *C08J 9/0066* (2013.01); *C08J 9/0095* (2013.01); *C08J 9/08* (2013.01); *C08J 9/102* (2013.01); *C08J 9/103* (2013.01); *C08J 9/105* (2013.01); *C08L 23/0853* (2013.01); *C08J 2201/022* (2013.01); *C08J 2201/026* (2013.01); *C08J 2203/02* (2013.01); *C08J 2203/04* (2013.01); *C08J 2205/06* (2013.01); *C08J 2323/08* (2013.01); *C08J 2331/04* (2013.01); *C08J 2403/02* (2013.01); *C08J 2409/06* (2013.01); *C08J 2423/06* (2013.01); *C08J 2423/08* (2013.01); *C08J 2423/20* (2013.01); *C08J 2433/02* (2013.01); *C08J 2433/08* (2013.01); *C08J 2433/12* (2013.01); *C08J 2451/06* (2013.01); *C08J 2453/02* (2013.01)

(58) Field of Classification Search
CPC ..... C08J 9/0014; C08J 9/0061; C08L 23/0853
See application file for complete search history.

(56) References Cited

U.S. PATENT DOCUMENTS

| 6,287,692 B1 * | 9/2001 | Luo .......................... C08L 23/06 174/110 PM |
| 2009/0173906 A1 * | 7/2009 | Park .................... C08L 23/0853 252/62.54 |
| 2014/0030520 A1 * | 1/2014 | Nakamura .......... C08L 23/0815 428/368 |

FOREIGN PATENT DOCUMENTS

| CN | 101724194 A | 6/2010 |
| CN | 102558659 A | 7/2012 |
| CN | 103804775 A | 5/2014 |
| JP | 06271700 A | 9/1994 |

OTHER PUBLICATIONS

ISR for PCT/CN2014/094868 dated on Apr. 1, 2015.
WO for PCT/CN2014/094868 dated on Mar. 24, 2015 (No English Translation Available on WIPO).
International Preliminary Report on Patentability (Chapter 1) for PCT/CN2014/094868 dated Sep. 6, 2016 and its English translation.
Written Opinion for PCT/CN2014/094868 dated Apr. 1, 2015 and its English Translation.

* cited by examiner

*Primary Examiner* — Melissa A Rioja
(74) *Attorney, Agent, or Firm* — Luoh J. Wu; Continent Patent Office LLP

(57) ABSTRACT

This present invention discloses a halogen-free flame retardant polyolefin foam composite, which is comprises: 80-125 parts by weight of ethylene/vinyl acetate copolymer (EVA), 8-13 parts by weight of high density polyethylene (HDPE) or low density polyethylene (LDPE), 15-25 parts by weight of polyolefin elastomer (POE), 60-77 parts by weight of acid source material, 17-22 parts by weight of carbon source material, 8-11 parts by weight of gas source material, 1-8 parts by weight of retardant synergist, 5.5-8 parts by weight of composite foaming agent, 0.7-1.0 parts by weight of crosslinking agent, 4.0-5.5 parts by weight of plasticizer, 0.5-1.6 parts by weight of surface treatment agent, 20-35 parts by weight of compatibility, 6-14 parts by weight of inorganic filler, and 1.6-4.6 parts by weight of additive. This halogen-free flame retardant polyolefin foam composite has the advantages of good softness, flexibility, impact resistance, low density, low compressibility and deformability, good shock absorbability, and so on.

6 Claims, No Drawings

HALOGEN-FREE FLAME-RETARDANT POLYOLEFIN COMPOSITE FOAM MATERIAL AND PREPARATION METHOD THEREOF

CROSS-REFERENCE TO RELATED APPLICATIONS

This application is the U.S. National Stage of International Patent Application No. PCT/CN2014/094868 filed on Dec. 24, 2014, which claims priority to and the benefit of Chinese Patent Application 201410078359.0 filed Mar. 6, 2014, the disclosures of which are hereby incorporated by reference in their entireties.

FIELD AND BACKGROUND OF THE INVENTION

This present invention, wherein a halogen-free flame retardant polyolefin foam composite and a preparation method thereof are disclosed, belongs to the field of polymer composite materials.

Polyolefin (PE) foam composite, especially ethylene/vinyl acetate copolymer (EVA) foam composite, has a low density and good elasticity, and is impact resistance, and so on. But, like most of other polymers, the PE foam composite burns easily with a large amount of heat, smoke, and toxic gases. Since the PE foam composite is derived from petrochemicals, it is very hard to degrade, which has enormous environmental impact.

Therefore, it is necessary to find a halogen-free flame retardant polyolefin foam composite to solve the above environmental concern. Adopting a type of halogen free, low smoke and low toxicity flame retardant to prepare foam composite has become a major focus in the study of flame retardant.

The flame retardant can be divided into reaction type and addition type according to its methods of use. The reaction type has good flame retardant durability and low toxicity, but its preparation is a complex and high-cost process. The addition type is a simple preparation process and can be widely used in many fields. The expansion type flame retardant system of additive flame retardant (IFR) is a research focus in recent years. Compared with aluminum hydroxide and magnesium hydroxide flame retardant, its characteristics are high efficiency of flame retardant, good stability, uniform dispersion, low density, moderate price, low smoke during burning, no melt dripping.

SUMMARY OF THE INVENTION

The present invention aims at developing a halogen-free flame retardant polyolefin foam composite and a preparation method thereof to overcome the disadvantages of the prior art. This halogen-free flame retardant polyolefin foam composite has the advantages of good softness, flexibility, impact resistance, low density, low compressibility and deformability, good shock absorbability, etc.

Thus, what is disclosed here is a halogen-free flame retardant polyolefin foam composite comprising:
  80-125 parts by weight of ethylene/vinyl acetate copolymer (EVA),
  8-13 parts by weight of high density polyethylene (HDPE) or low density polyethylene (LDPE),
  15-25 parts by weight of polyolefin elastomer (POE),
  60-77 parts by weight of acid source material,
  17-22 parts by weight of carbon source material,
  8-11 parts by weight of gas source material,
  1-8 parts by weight of retardant synergist,
  5.5-8 parts by weight of composite foaming agent,
  0.7-1.0 parts by weight of crosslinking agent,
  4.0-5.5 parts by weight of plasticizer,
  0.5-1.6 parts by weight of surface treatment agent,
  20-35 parts by weight of compatibility,
  6-14 parts by weight of inorganic filler, and
  1.6-4.6 parts by weight of additive The said POE comprises one or more of the following materials: ethylene-octene copolymer, ethylene-styrene copolymer, ethylene-propylene-styrene block copolymer, phenyl ethyl-ethylene/butene-styrene copolymer and styrene-isoprene-styrene copolymer.

The said acid source material comprises one or more of the following materials: ammonium polyphosphate, ammonium polyphosphate, phosphoric acid, boric acid and borate;

The said carbon source material comprises one or more of the following materials: corn starch, tapioca starch, potato starch and mung bean starch;

The said gas source material comprises one or more of the following materials: melamine, carbonic foaming agent and urea;

The said retardant synergist comprises one or more of the following materials: aluminum hydroxide, hexahydroxy zinc stannate, organic montmorillonite and zinc borate.

The said composite foaming agent comprises one or more of the following materials: azobisformamide, azodiisobutyronitrile, sodium bicarbonate, 1,3-benzene sulfonyl hydrazide and p-toluene sulfonyl hydrazine;

The said dicumyl peroxide is used as crosslinking agent;

The said plasticizer comprises two or more of the following materials: glycerin, citric acid, ethanol and polyvinyl alcohol.

The said surface treatment agent comprises one or more of the following materials: silane coupling agent, titanate coupling agent, titanium phosphate ester coupling agent and aluminum composite coupling agent;

The said compatibility comprises one or more of the following materials: ethylene-acrylic acid, maleic anhydride grafted HDPE, methyl methacrylate and butyl acrylate copolymer;

The said inorganic filler comprises one or more of the following materials: talcum powder, bentonite and kaolin.

The said additive is compounded of 0.1-0.6 parts by weight of stearic acid, 0.5-1.0 parts by weight of zinc stearate, and 1-3 parts by weight of zinc oxide.

Also disclosed herein is a process for preparing a type of halogen-free flame retardant polyolefin foam composite, comprising the steps of:
  Step 1: mixing the acid source material with the surface treatment agent, stirring the mixture for 3-5 minutes at high agitation speed, then drying the mixture for 8-10 hours under the temperature between 40-60° C.;
  Step 2: mixing the carbon source material with the plasticizer, stirring the mixture for 5-15 minutes at high agitation speed, and then packing the mixture with sealed bag for 24-48 hours;
  Step 3: mixing the acid source material obtained from Step 1 well with the carbon source material obtained from Step 2, then adding gas source material to the mixture, stirring well, and then packing the mixture with sealed bag to obtain composite flame retardant;
  Step 4: adding the EVA, HDPE or LDPE, and POE to a mixer, preheating the mixture for 5-8 minutes, then adding the composite flame retardant obtained from Step 3, retardant synergist, composite foaming agent, crosslinking agent, compatibility, inorganic filler and additive to the mixer, melting and blending the mixture for 10-15 minutes under the temperature between 90-120° C.;

Step 5: quickly moving the mixture obtained from Step 4 into an open mixing machine, molding for 3-5 times under the temperature between 78-85° C., then crushing the mixture;

Step 6: weighing the mixture obtained from Step 5, adding to a preheated mould, curing and foaming the mixture for 8-10 minutes by a plate vulcanizing machine under the temperature between 160-175° C. and a pressure of 10-13 MPa.

The present invention offers the following significant advantages:

1) By using EVA with good compatibility as substrate material and mixing it with other raw materials such as HDPE/LDPE, POE and compatibility, foam composite compatibility and binding force of organic and inorganic powder are improved. Moreover, bubble bursting and coalescing in the foam composite and melt-strength reduction caused by excessive powder during the process of foam are avoided.

2) The composite flame retardant belongs to the expansion type flame retardant system, which has high efficiency, low smoke during burning, and no molten drops. The contained carbon source material, such as starch, are fully biodegradable, which is environment friendly.

3) And inorganic filler is used to improve the dimension stability and increase the intensity of polyolefin. It also reduces the production cost to a certain extent.

4) This halogen free flame retardant polyolefin foam composite has the advantages of having good flame retardant properties, mechanical properties, impact resistance, and being environmental friendly. As such, it has broad market prospects and remarkable social and economic benefits.

DESCRIPTION OF THE PREFERRED EMBODIMENTS

The present invention is further described in the following exemplified embodiments to illustrate the application of the principles of the invention. It is understood that the invention may be embodied otherwise without departing from such principles. The scope of the claims of the present invention expressly should not be limited to such exemplary or preferred embodiments.

Three embodiments are discussed below, the compositions thereof are summarized in Table 1:

TABLE 1

Compositions of the halogen-free flame retardant polyolefin foam composite (parts by weight)

| Raw material | Embodiment 1 | Embodiment 2 | Embodiment 3 |
| --- | --- | --- | --- |
| EVA | 80 | 100 | 125 |
| HDPE/LDPE | 8 | 10 | 13 |
| POE | 15 | 20 | 25 |
| acid source material | 60 | 74 | 77 |
| carbon source material | 17 | 21 | 22 |
| gas source material | 8 | 10 | 11 |
| retardant synergist | 1 | 3.5 | 8 |
| composite foaming agent | 5.5 | 6.2 | 8.0 |
| crosslinking agent | 0.7 | 0.9 | 1.0 |
| plasticizer | 4.0 | 4.5 | 5.5 |

TABLE 1-continued

Compositions of the halogen-free flame retardant polyolefin foam composite (parts by weight)

| Raw material | Embodiment 1 | Embodiment 2 | Embodiment 3 |
| --- | --- | --- | --- |
| surface treatment agent | 0.5 | 0.8 | 1.6 |
| compatibility | 15 | 20 | 25 |
| inorganic filler | 6 | 10 | 14 |
| additive | 1.6 | 2.5 | 4.6 |

In Table 1, the POE is ethylene-octene copolymer; the acid source material, the carbon source material, and the gas source material are ammonium polyphosphate, tapioca starch, and melamine, respectively; the composite foaming agent is azobisformamide; the crosslinking agent is dicumyl peroxide; the plasticizer is the complex of glycerol and citric acid (a mass ratio of 3:4); the surface treatment agent is silane coupling agent (KH570); the compatibility is ethylene-acrylic acid (EAA); the inorganic filler is talcum powder; and the additive is compounded of 0.1-0.6 parts by weight of stearic acid, 0.5-1.0 parts by weight of zinc stearate and 1-3 parts by weight of zinc oxide.

The process for preparing the halogen-free flame retardant polyolefin foam composite comprises the following steps:

Step 1: surface treatment of acid source material by mixing ammonium polyphosphate with KH570, stirring for 5 minutes at high agitation speed, then drying for 8 hours under the temperature of 60° C.;

Step 2: plasticizing treatment of carbon source material by mixing tapioca starch with the plasticizer, stirring for 10 minutes at high agitation speed, and then packing with sealed bag for 36 hours;

Step 3: mixing the acid source material obtained from Step 1 well with the carbon source material obtained from Step 2, then adding melamine to the mixture, stirring the mixture well, and then packing the mixture with a sealed bag to obtain composite flame retardant;

Step 4: adding the EVA, HDPE or LDPE, and POE to a mixer, preheating the mixture for 5 minutes, then adding the composite flame retardant obtained from Step 3, retardant synergist, composite foaming agent, crosslinking agent, compatibility, inorganic filler and additive to the mixer, melting and blending for 12 minutes under the temperature of 100° C.;

Step 5: quickly moving the mixture obtained from Step 4 into an open mixing machine, molding for 4 times under the temperature of 80° C., then crushing the mixture;

Step 6: weighing the mixture obtained from Step 5, adding to a preheated mould, curing and foaming the mixture for 9 minutes by a plate vulcanizing machine under the temperature of 170° C. and a pressure of 12 MPa.

The performance data for the foam composites prepared by Embodiment 1-3 and the Adidas PO-EVA00049 standard are compared in Table 2:

TABLE 2

Comparison of performance results

| Test items | Adidas PO-EVA00049 standard | Embodiment 1 | Embodiment 2 | Embodiment 3 |
| --- | --- | --- | --- | --- |
| Oxygen index/% | / | 25.0 | 25.3 | 26.9 |
| Vertically burning/UL-94 | / | V-0 | V-1 | V-0 |

TABLE 2-continued

Comparison of performance results

| Test items | Adidas PO-EVA00049 standard | Embodiment 1 | Embodiment 2 | Embodiment 3 |
|---|---|---|---|---|
| tensile strength/MPa | ≥2 | 2.21 | 2.43 | 2.54 |
| Resilience/% | ≥35 | 41.5 | 40.2 | 38.8 |
| specific gravity/g.cm-3 | 0.17-0.22 | 0.18 | 0.20 | 0.21 |
| Hardness (Asker C) | 52-58 | 55.6 | 53.5 | 55.0 |
| Tear strength/N.mm-1 | ≥4 | 8.34 | 9.26 | 11.62 |
| Compression deformation/% | ≤60 | 39.5 | 38.7 | 38.2 |
| Elongation at break/% | ≥200 | 210.53 | 271.36 | 292.45 |
| Resistance to bending/time not crack | ≥30000 | 30000 | 30000 | 30000 |

What is claimed is:

1. A halogen-free flame retardant polyolefin foam composite comprising:
    80-125 parts by weight of ethylene/vinyl acetate copolymer (EVA),
    8-13 parts by weight of high density polyethylene (HDPE) or low density polyethylene (LDPE),
    15-25 parts by weight of polyolefin elastomer (POE),
    60-77 parts by weight of acid source material,
    17-22 parts by weight of carbon source material,
    8-11 parts by weight of gas source material,
    1-8 parts by weight of retardant synergist,
    5.5-8 parts by weight of composite foaming agent,
    0.7-1.0 parts by weight of crosslinking agent,
    4.0-5.5 parts by weight of plasticizer,
    0.5-1.6 parts by weight of surface treatment agent,
    20-35 parts by weight of compatibility agent,
    6-14 parts by weight of inorganic filler, and
    1.6-4.6 parts by weight of additive,
    wherein the additive is comprised of 0.1-0.6 parts by weight of stearic acid, 0.5-1.0 parts by weight of zinc stearate, and 1-3 parts by weight of zinc oxide,
    wherein the gas source material is melamine, urea, or a combination thereof;
    wherein the composite foaming agent is selected from: azobisformamide, azodiisobutyronitrile, sodium bicarbonate, and p-toluene sulfonyl hydrazine;
    wherein the compatibility agent is selected from: ethylene-acrylic acid, malice anhydride grafted HDPE, methyl methacrylate and butyl acrylate copolymer.

2. The composite as claimed in claim 1, wherein the POE comprises one or more materials selected from: an ethylene-octene copolymer, an ethylene-styrene copolymer, a phenyl-ethyl-ethylene-butene-styrene copolymer, and styrene-isoprene-styrene copolymer.

3. The composite as claimed in claim 1, wherein
    the acid source material comprises one or more materials selected from: ammonium polyphosphate, phosphoric acid, and a borate;
    the carbon source material comprises one or more materials selected from: corn starch, tapioca starch, potato starch and mung bean starch;
    and the retardant synergist comprises one or more materials selected from: aluminum hydroxide and organic montmorillonite.

4. The composite as claimed in claim 1, wherein
    dicumyl peroxide is used as the crosslinking agent; and
    the plasticizer comprises two or more materials selected from: glycerin, citric acid, ethanol, and polyvinyl alcohol.

5. The composite as claimed in claim 1. wherein the surface treatment agent comprises one or more materials selected from:
    a silane coupling agent, a titanate coupling agent, a titanium phosphate ester coupling agent, and an aluminum composite coupling agent;
    and the inorganic filler comprising one or more materials selected from: talcum powder, bentonite, and kaolin.

6. A process for preparing a halogen-Free flame retardant polyolefin foam composite as claimed in claim 1, comprising the steps of:
    Step 1: mixing the acid source material with the surface treatment agent to form a first mixture, stirring the first mixture for 3-5 minutes at a high agitation speed, and then drying the mixture for 8-10 hours at a temperature between 40-60° C.;
    Step 2: mixing the carbon source material with the plasticizer to form a second mixture, stirring the, second mixture for 5-15 minutes at a high agitation speed, and then packing the second mixture in a sealed baa for 24-48 hours;
    Step 3: mixing the first mixture with second mixture to obtain a third mixture, then adding the gas source material to the third mixture, and stirring to obtain a fourth mixture, and then packing the fourth mixture in a sealed baa to obtain a composite flame retardant;
    Step 4: adding the EVA, HDPE or LDPE, and POE to a mixer to obtain a fifth mixture, preheating the fifth mixture for 5-8 minutes, then adding the composite flame retardant obtained from Step 3, retardant synergist, composite foaming agent, crosslinking agent, compatibility agent, inorganic filler, and additive to the fixer, and melting and blending for 10-15 minutes at a temperature between 90-120° C. to form a molten composition;
    Step 5: quickly moving the molten composition obtained from Step 4 into an open mixing machine, molding at a temperature between 78-85° C., and then crushing to obtain a crushed composition;
    Step 6: weighing the crushed composition obtained from Step 5, adding it to a preheated mould, and curing and foaming the crushed composition for 8-10 minutes by a plate vulcanizing machine at a temperature between 160-175° C. and a pressure of 10-13 MPa.

* * * * *